United States Patent
Holland

[11] 3,791,511
[45] Feb. 12, 1974

[54] CONVEYOR SYSTEM
[75] Inventor: John H. Holland, Cleveland, Okla.
[73] Assignee: Arkansas Rock and Gravel Co., Mufreesboro, Ark.
[22] Filed: Dec. 10, 1971
[21] Appl. No.: 206,634

Related U.S. Application Data
[63] Continuation-in-part of Ser. No. 81,794, Oct. 19, 1970, abandoned.

[52] U.S. Cl. .............................. 198/172, 198/229
[51] Int. Cl. ...................... B65g 19/10, B65g 45/00
[58] Field of Search............ 198/168, 175, 171–172, 198/229, 204

[56] References Cited
UNITED STATES PATENTS
| | | | |
|---|---|---|---|
| 545,690 | 9/1895 | Hunter | 198/175 |
| 1,560,716 | 11/1925 | Newdick | 198/175 |
| 3,314,527 | 4/1967 | Pearson | 198/175 |
| 1,845,066 | 2/1932 | Walter | 198/204 UX |
| 2,635,735 | 4/1953 | Smith | 198/204 |

Primary Examiner—Edward A. Sroka

[57] ABSTRACT

A conveyor system for asphalt, concrete, aggregate and similar materials includes a plurality of conveyor flights and a pair of chains for moving the flights along a material supporting floor. Each flight includes end portions which attach the flight to the chains and a central portion having a hollow triangular cross section that extends substantially across the floor to define a narrow edge at the lower leading portion of the flight. The end portions support each flight with the narrow edge of the central portion facing and spaced from the floor. By this means the narrow edge and the spaced positioning of the edge relative to the floor prevent stones from accumulating between the flight and the floor.

18 Claims, 7 Drawing Figures

PATENTED FEB 12 1974
3,791,511
SHEET 1 OF 2
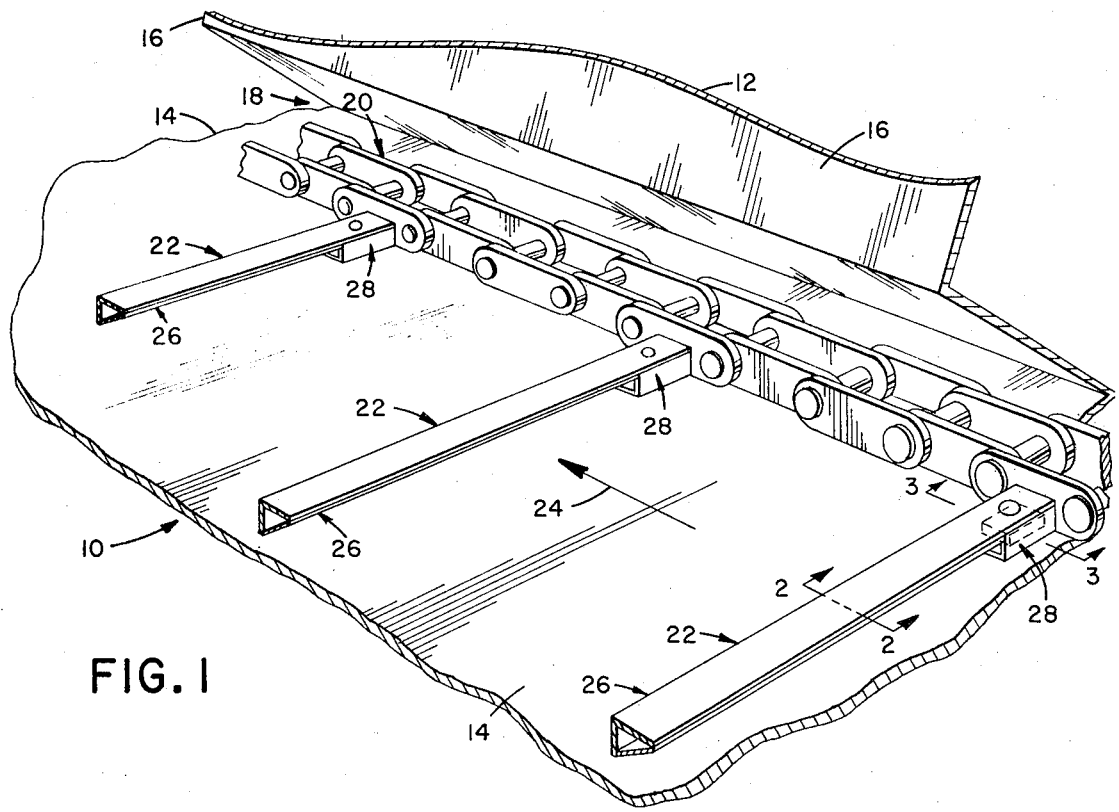
FIG. 1
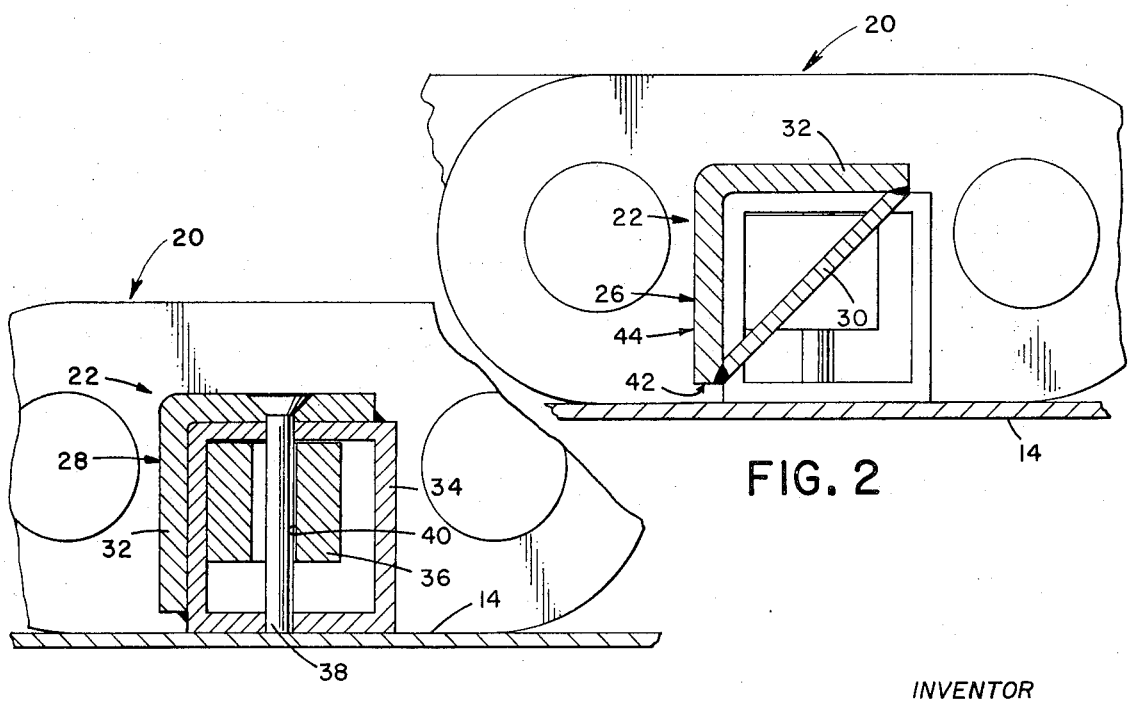
FIG. 3
FIG. 2
INVENTOR
JOHN H. HOLLAND
RICHARDS, HARRIS & HUBBARD
ATTORNEYS

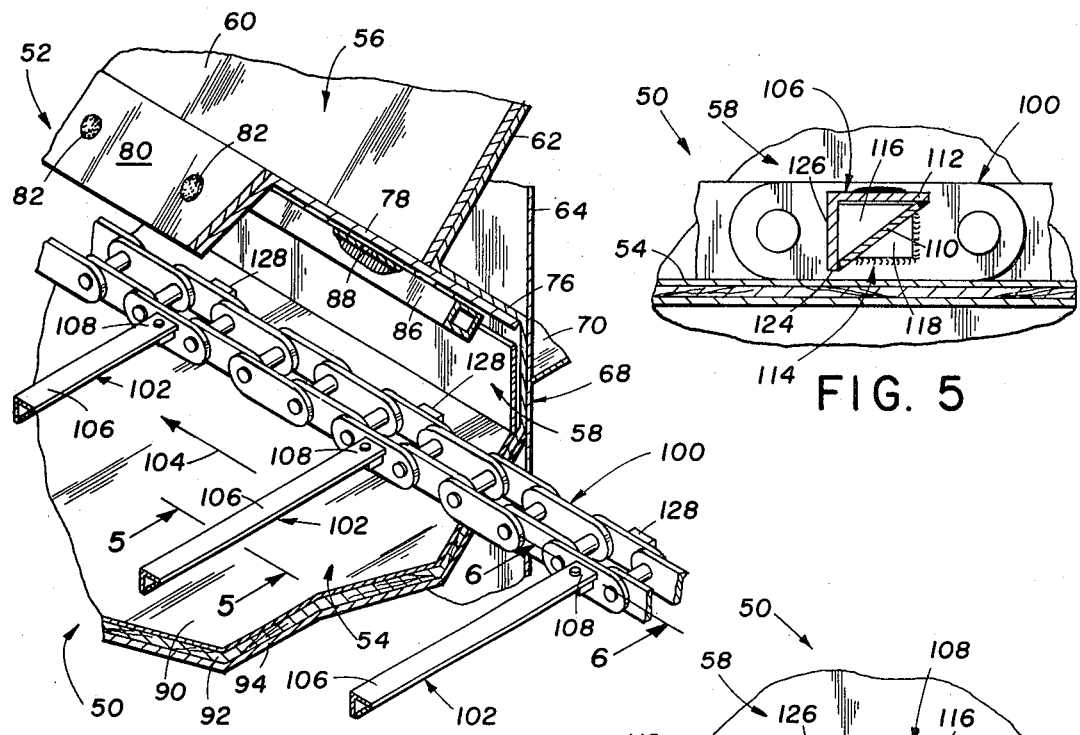
FIG. 4
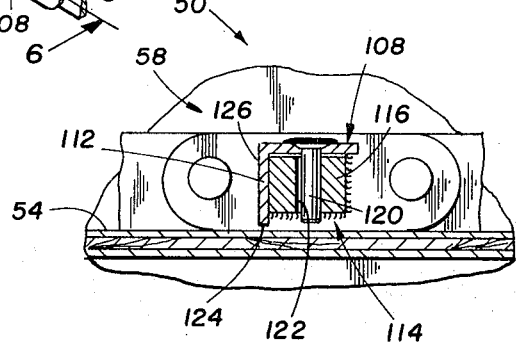
FIG. 5
FIG. 6
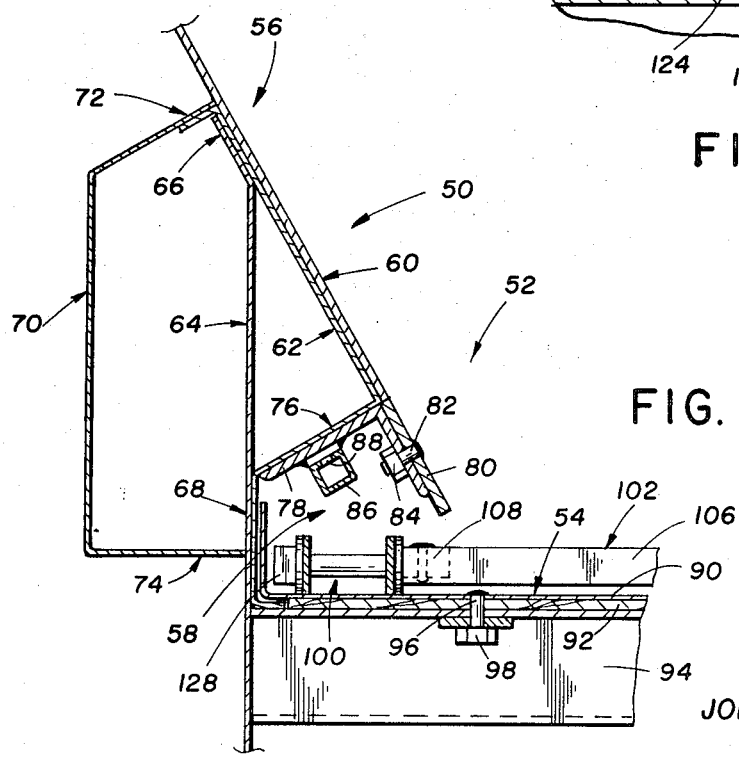
FIG. 7
INVENTOR
JOHN H. HOLLAND
RICHARDS, HARRIS & HUBBARD
ATTORNEYS 3,791,511

CONVEYOR SYSTEM

CROSS REFERENCE TO RELATED APPLICATION

This application is a continuation-in-part of co-pending application Ser. No. 81,794, filed Oct. 19, 1970, now abandoned.

BACKGROUND AND SUMMARY OF THE INVENTION

This invention relates to conveyor systems, and more particularly to an improved conveyor flight and a conveyor system incorporating the improved flight.

Self-unloading vehicles, storage hoppers, and similar devices often employ conveyor systems to transfer materials from place to place. One type of conveyor system that is often utilized for this purpose includes a pair of drive chains and a plurality of flights connected between the chains. Typically, the chains are mounted for movement around spaced, parallel courses that extend adjacent to a material supporting floor. The flights are positioned at spaced intervals and are driven lengthwise of the floor by the chains. In this manner, materials supported on the floor are transported from one point to another.

At the present time, most conveyor systems are equipped with flights that are rectangular in cross section. It has been found that when conveyor systems including rectangular flights are used to convey asphalt, aggregate, concrete and similar materials, stones tend to lodge between the flights and the floor. This phenomenon is progressive in that when a small stone enters the space between a flight and the floor, the flight is displaced upwardly, and this permits the entry of somewhat larger stones etc. The presence of a number of fairly large stones between a flight and the floor produces several detrimental results, including increased drag, increased flight and floor wear due to scoring, increased power consumption, etc.

The present invention relates to an improved conveyor system that eliminates the foregoing problem. In accordance with the preferred embodiment of the invention, a conveyor system comprises flights having longitudinally extending narrow edges. The flights are supported with the narrow edges positioned adjacent to and spaced from a material supporting surface. The combination of separation between the flights and the surface and a narrow edge that faces the surface allows stones to pass between the flights and the surface without becoming lodged therebetween.

DESCRIPTION OF THE DRAWINGS

A more complete understanding of the invention may be had by referring to the following Detailed Description when taken in conjunction with the accompanying Drawings, wherein:

FIG. 1 is a perspective view of a conveyor system incorporating a first embodiment of the invention in which certain parts have been broken away more clearly to illustrate certain features of the invention;

FIG. 2 is a sectional view taken generally along the line 2—2 in FIG. 1 in the direction of the arrows;

FIG. 3 is a sectional view taken generally along the line 3—3 in FIG. 1 in the direction of the arrows;

FIG. 4 is a perspective view of a conveyor system incorporating a second embodiment of the invention in which certain parts have been broken away more clearly to illustrate certain features of the invention;

FIG. 5 is a sectional view taken generally along the line 5—5 in FIG. 4 in the direction of the arrows;

FIG. 6 is a sectional view taken generally along the line 6—6 in FIG. 4 in the direction of the arrows; and FIG. 7 is an end view further illustrating the second embodiment of the invention.

DETAILED DESCRIPTION

Referring now to the Drawings, and particularly to FIG. 1 thereof, a conveyor system 10 incorporating a first embodiment of the present invention is shown. The conveyor system 10 includes a hopper 12 comprising a floor 14 and a pair of side walls 16 (only one of which is shown). The walls 16 taper generally inwardly and downwardly, but taper outwardly and downwardly at their lower ends to provide a pair of chain receiving channels 18. The floor 14 extends horizontally between the lower ends of the walls 16.

The conveyor system 10 further includes a pair of drive chains 20 (only one of which is shown). The drive chains 20 are mounted for movement around spaced, parallel courses, portions of which extend through the chain receiving channels 18 of the wall 16 adjacent the opposite edges of the floor 14. The courses are defined by conventional sprockets mounted in meshing interengagement with the chains 20, and the chains 20 are driven through the sprockets by conventional drive motors.

A plurality of conveyor flights 22 extend between the drive chains 20 of the conveyor system 10. The flights 22 are mounted at equally spaced intervals along the drive chain 20 for movement through the hopper 12 in the direction of the arrow 24. As is best shown in FIG. 1, each flight 22 comprises a central portion 26 which extends substantially the entire width of the floor 14 and a pair of mounting portions 28 located at the opposite ends of the central portion 26.

Referring now to FIG. 2, the central portion 26 of each flight 22 comprises a member of hollow triangular cross section that is preferably formed by welding a stiffener 30 between the edges of a length of angle iron 32. This construction is advantageous in that the flight is easily constructed from readily available parts, has good rigidity of the type associated with triangular cross sections, and exhibits a high section modulus when compared with its weight and frontal area.

As is best shown in FIG. 3, the angle iron 32 of the central portion 26 of each flight 22 also forms a portion of the mounting portions 28 of the flight. The angle iron 32 extends beyond the ends of the stiffener 30 and receives a box 34 comprising a length of conventional rectangular tubing. The box 34 is welded to the angle iron 32, and in turn receives a lug 36 which is welded to one of the links of the chain 20. A retaining pin 38 extends through the angle iron 32, through the box 34, and through a hole 40 formed in the lug 36. The pin 38 is welded to the angle iron 32, and serves to prevent lateral movement between the flight 22 and the chain 20. However, as is clearly shown in FIG. 3, the hole 40 is of sufficient diameter to permit direct driving interengagement between the lug 36 and the interior of the box 34. That is, the chains 20 drive the flights 22 by direct engagement of the lugs 36 with the mounting portions 28, and no driving power is applied through the retaining pins 38.

Referring again to FIG. 2, the hollow triangular cross section of the central portion 26 of each flight 22 provides a narrow edge 42 that extends longitudinally of the flight at the lower end of a forward facing material engaging surface 44. The boxes 34 of the mounting portions 28 of each flight 22 engage the floor 14 of the hopper 12, and therefore support the narrow edge 42 adjacent to and out of engagement with the floor 14. Because the narrow edge 42 is spaced from the floor 14, small stones pass directly under the flight 22 during the movement of the flight relative to the floor in the direction of the material engaging surface 44. Also, should a stone become lodged between the flight 22 and the floor 14, the narrow width of the edge 42 longitudinally of the floor 14 causes the stone to pass out from under the edge 42 as soon as force is applied between the flight and the floor 14. In this manner, the construction illustrated in the Drawing prevents stones from accumulating between the flights 22 and the floor 14 of the conveyor system 10.

Referring now to FIGS. 4 through 7, there is shown a conveyor system 50 incorporating a second embodiment of the invention. The conveyor system 50 includes a generally V-shaped hopper 52 comprising a floor 54 and a pair of side walls 56 (only one of which is shown). The walls 56 taper generally inwardly and downwardly, but taper outwardly and downwardly at their lower ends to provide a pair of chain receiving channels 58. The floor 54 extends horizontally between the lower ends of the side walls 56.

Referring particularly to FIG. 7, each side wall 56 of the hopper 52 comprises a plate 60 which is supported on an irregularly shaped member 62. A member 64 extends substantially vertically and includes an upper portion 66 and an intermediate portion 68 which are secured to the member 62. The structural support for the wall 56 is completed by a generally rectangularly shaped member 70 including an upper portion 72 which is secured to the plate 60 and the member 62 and a lower portion 74 which is secured to the member 64.

The member 62 includes a portion 76 which extends substantially perpendicularly to the plate 60 to form the chain receiving channel 58. An angle iron 78 is supported on the perpendicularly extending portion 76 of the member 62 and in turn supports a wear plate 80. The wear plate 80 is secured to the angle iron 78 by means of a plurality of bolts 82 which are welded to the wear plate 80, and a plurality of nuts 84 which are threadedly engaged with the bolts 82.

The angle iron 78 also supports a length of rectangular tubing 86 having discharge apertures 88 formed therein. The length of the tubing 86 is offset from the angle iron 78 by spacers and the apertures 88 are directed upwardly. By this means lubricating fluid may be discharged into the chain receiving channels 58 through the lengths of tubing 86 and the apertures 88 without danger of the apertures becoming clogged.

The floor 54 of the hopper 52 comprises a plurality of plates 90 which extend across the entire width of the hopper 52 and which are supported by a plywood layer 92. The plywood layer 92 is in turn supported on a plurality of hat sections 94 extending between the members 64 of the walls 56. The plates 90 are secured to the hat sections 94 by means of bolts 96 which are welded to the plates 90 and nuts 98 which are threadedly engaged with the bolts 96. The bolts 96 extend through cleats 99 which receive bolts 96 from adjacent plates 90 to establish a gap therebetween and thereby accommodate thermal expansion of the plates.

The conveyor system 50 further includes a pair of drive chains 100. The drive chains 100 are mounted for movement around spaced, parallel courses including portions which extend through the chain receiving channels 58 of the side walls 56 adjacent the opposite edges of the floor 54. The courses of the chains 100 are defined by conventional drive sprockets which are mounted in mesh with the chains 100 and which are operated by conventional drive motors to move the chains 100 around their respective courses.

A plurality of conveyor flights 102 extend between the drive chains 100 of the conveyor system 50. The flights 102 are mounted at equally spaced intervals along the drive chains 100 for movement through the hopper 52 in the direction of the arrow 104. As is best shown in FIG. 4, each flight 102 comprises a central portion 106 which extends substantially the entire width of the floor 54, and a pair of mounting portions 108 located at the opposite ends of the central portion 106.

Referring now to FIG. 6, the central portion 106 of each flight 102 comprises a member of hollow triangular cross section that is preferably formed by welding a stiffener 110 between the edges of a length of angle iron 112. This construction is highly advantageous in that the flight is readily and easily constructed, has good rigidity of the type associated with triangular cross sections and exhibits a high section modulus when compared with its weight and frontal area.

As is best shown in FIG. 6, the mounting portions 108 of each conveyor flight 102 comprise portions of the angle iron 112 which extend beyond the ends of the stiffener 110 and which are supported on lugs 114. Each lug 114 comprises a triangularly shaped portion 116 which extends into the central portion 106 of the flight and a rectangular portion 118 which is welded to one of the links of one of the chains 100. A retaining pin 120 extends through each mounting portion 108 of each conveyor flight 102 and through a hole 122 formed in the corresponding lug 114. The pin 120 is welded to the angle iron 112 and serves to prevent lateral movement between the flight 102 and the chain 100. However, as is clearly shown in FIG. 6, the hole 122 is of sufficient diameter to permit direct driving interengagement between the lug 114 and the interior of the flight 102. That is, the chains 100 drive the flights 102 by direct engagement of the lugs 114 with the flights 102, and driving power is not applied through the retaining pins 120.

Referring again to FIG. 5, the hollow triangular cross section of the central portion 106 of each flight 102 provides a narrow edge 124 that extends longitudinally of the flight at the lower end of a forward facing material engaging surface 126. The mounting portions 108 of each flight 102 support the flight 102 with the narrow edge 124 adjacent to but out of engagement with the floor 54. Since the narrow edge 124 is spaced from the floor 54, small stones pass directly under the flight 102 during movement of the flight relative to the floor in the direction of the material engaging surface 126. Also, should a stone become lodged between a flight 102 and the floor 54, the narrow width of the edge 124 longitudinally of the floor 54 causes the stone to pass out from under the edge 124 as soon as force is applied between the flight and the floor by the drive chains 100. In this manner the flight construction illustrated in the Drawings prevents stones from accumulating between the flights and floor of the conveyor system 50.

The conveyor system 50 illustrated in FIGS. 4 through 7 differs from the conveyor system 10 illustrated in FIGS. 1 through 3 in several significant respects. First, the chains 100 of the conveyor system 50 are provided with lugs 128 which extend outwardly from the chains 100. The lugs 128 are positioned directly opposite each other on the chains 100 and function to clear stones and other debris from the chain receiving channels 58 of the hopper 52. By this means the lugs 128 function to prevent accumulations of such debris which might otherwise interfere with the movement of the chains 100 through the chain receiving channels 58.

Another important distinction between the conveyor system 50 and the conveyor system 10 is the mounting of the lengths of rectangular tubing 86 in the chain receiving channels 58 to permit the discharge of lubricating fluid onto the chains 100 prior to the loading of material into the hopper 52. It has been found that the accumulation of debris between the links of the chain 100, etc., is greatly reduced by this technique.

Still another important distinction between the conveyor system 50 and the conveyor system 10 comprises the construction of the mounting portions 108 of the flights 102 and the lugs 114 on the chain 100, whereby no portion of the flights 102 engages the floor 54 as the flights are moved lengthwise of the floor by operation of the drive chains 100. It has been found that this construction greatly reduces wear that otherwise might be encountered in the operation of the conveyor system 50.

From the foregoing, it will be understood that the present invention comprises a conveyor system including a plurality of conveyor flights each having a narrow edge extending lengthwise thereof, and structure for supporting the flights for movement along a material supporting surface with the narrow edges of the flights positioned adjacent to and spaced from the surface. Each flight preferably comprises a central portion of hollow triangular cross section and mounting portions secured to the opposite end of the central portion for securing the flight to a pair of drive chains. Such a construction is advantageous over the prior art in that it prevents the accumulation of stones between the flights and the floor, and thereby substantially reduces the power consumption and wear characteristics that have proved detrimental in prior conveyor systems.

Although the preferred embodiments of the present invention have been illustrated in the Drawings and described in the foregoing specification, it will be understood that the invention is not limited to the embodiments disclosed, but is capable of rearrangement, modification and substitution of parts and elements without departing from the spirit of the invention.

What is claimed is:

1. A particulate material conveyor system comprising:
   a particulate material receiving hopper comprising generally downwardly and inwardly sloping side walls and an imperforate floor extending between the lower portions of the side walls;
   a pair of drive chains mounted for movement along spaced, parallel paths extending along the opposite edges of the floor adjacent the side walls;
   a plurality of flights each connected between the chains for movement along the floor to transport particulate material through the hopper;
   each of said flights defining a triangular cross section including a substantially narrow apex facing the floor;
   said flights defining open spaces therebetween so that particulate material in the hopper is supported directly on the floor for transportation therealong by the flights under the action of the claims;
   each of said flights having a material engaging surface extending substantially perpendicularly with respect to the floor during movement of the flight through the hopper; and
   a plurality of lugs extending inwardly from the chains each for supporting one end of one of the flights;
   said lugs supporting each flight with the narrow apex thereof normally positioned out of engagement with the floor and thereby further preventing particles of particulate material from becoming lodged between the flight and the floor.

2. The particulate material conveyor system according to Claim 1 wherein each lug extends into the adjacent end of its corresponding flight, and further including pins extending through the flights and the lugs for preventing substantial lateral movement of the flights while accommodating direct engagement between the interior of each flight and the lugs received therein so that drive power from the chains is imported directly to each flight by its corresponding lugs.

3. The particulate material conveyor system according to claim 1 further including chain receiving channels formed in the side walls of the particulate material receiving hopper at the intersections thereof with the floor, and wherein the paths of the chains extend through the chain receiving channels so that the chains are protected from the weight of the particulate material received in the hopper.

4. A particulate material conveyor system comprising:
   a particulate material receiving hopper including a floor and a pair of side walls each sloping downwardly and inwardly and then downwardly and outwardly to form chain receiving channels at the intersections of the side walls and the floor;
   a pair of drive chains mounted for movement along spaced, parallel paths each extending through one of the chain receiving channels so that the drive chains are protected by the chain receiving channels from the weight of particulate material received in the hopper;
   a plurality of flights each connected between the drive chains for movement thereby along the floor to transport particulate material through the hopper; and
   a plurality of lugs each extending outwardly from the chains for cleaning debris out of the chain receiving channels.

5. The conveyor system according to claim 4 wherein each of the flights comprise a material engaging surface extending generally upwardly from the floor during movement of the flight through the particulate material receiving hopper and a narrow edge facing the floor so that particles of particulate material cannot become lodged between the flight and the floor.

6. The particulate material conveyor system according to claim 5 wherein each of the flights comprise a hollow triangular cross section and further including sets of aligned lugs each extending inwardly from the drive chains and into the opposite ends of one of the flights for direct contact with the interior portions of the flight to drive the flight through the particulate material receiving hopper.

7. The particulate material conveyor system according to claim 6 wherein the lugs support the flights with the narrow edges thereof out of engagement with the floor thereby further preventing particles of particulate material from becoming lodged between the flights and the floor.

8. A conveyor system comprising:
a hopper including generally downwardly and sloping side walls and a floor extending between the lower end of the side walls;
a pair of drive chains mounted for movement along the spaced, parallel paths extending along opposite edges of the floor adjacent the lower ends of the side walls;
a plurality of lugs mounted on the chains and extending outwardly therefrom for cleaning debris out of the portions of the hopper adjacent the intersections of the side walls with the floor; and
a plurality of flights each connected between the drive chains for movement thereby along the floor to transport material through the hopper.

9. The conveyor system according to claim 8 wherein each side wall of the particulate material receiving hopper slopes downwardly and inwardly and then downwardly and inwardly to define chain receiving channels, and wherein the paths of the drive chains extend through the chain receiving channels.

10. The conveyor system according to claim 8 wherein each of the flights comprises a material engaging surface extending substantially perpendicularly to the floor during movement of the flight through the hopper and a narrow edge facing the floor so that particles of material in the hopper cannot become lodged between the flight and the floor.

11. The conveyor system according to claim 10 wherein each of the flights further comprise a hollow triangular cross section and further including a plurality of lugs each extending inwardly from one of the drive chains and received in one end of the flights for direct contact therewith to drive the flight through the hopper.

12. The conveyor system according to claim 11 wherein the flights are supported on the chains with the narrow edge thereof out of engagement with the floor thereby further preventing particles from becoming lodged between the flights of the floor.

13. A conveyor system including:
at least one conveyor flight comprising a material engaging surface and a narrow edge positioned at the lower edge of the material engaging surface;
a pair of chains mounted for movement around spaced, parallel courses including portions extending along the edges of a material supporting floor;
a pair of lugs extending inwardly from the chains for supporting and driving the flight along the floor in the direction of the material engaging surface and with the narrow edge of the flight positioned out of engagement with the floor;
a pair of pins extending through the ends of the flight and the lugs for preventing lateral movement of the flight relative to the chains;
means defining a pair of chain receiving channels extending along the opposite edges of the floor and substantially enclosing the courses of the chains; and
lugs extending outwardly from the chain for cleaning debris from the chain receiving channels.

14. A conveyor system comprising:
a material receiving hopper including a material supporting floor and side walls that slope downwardly and inwardly and then downwardly and outwardly to form chain receiving channels;
a pair of conveyor chains mounted for movement around spaced, parallel courses extending adjacent the floor through the chain receiving channels;
a plurality of conveyor flights each having a hollow triangular cross section that extends substantially across the floor, said triangular cross section being characterized by a narrow apex facing the floor;
a plurality of lugs secured to and extending inwardly from the chains and into the ends of the flights;
a plurality of pins each extending through one end of one of the flights and the lug received therein for preventing lateral movement of the flights relative to the chains;
said lugs supporting the flights with said narrow apex thereof positioned adjacent to and normally spaced a predetermined distance from the floor.

15. The conveyor system according to claim 14 further including additional lugs secured to and extending outwardly from the lugs for cleaning debris out of the chain receiving channels.

16. The conveyor system according to claim 14 further including means for directing lubricating fluid into the chain receiving channels and onto the portions of the chains extending therethrough.

17. A particulate material conveyor system comprising:
a particulate material receiving hopper comprising generally downwardly and inwardly sloping side walls and a floor extending between the lower portions of the side walls;
a pair of drive chains mounted for movement along spaced, parallel paths extending along the opposite edges of the floor adjacent the side walls;
a plurality of flights each connected between the chains for movement along the floor to transport particulate material through the hopper,
each of said flights having a material engaging surface extending substantially perpendicularly with respect to the floor during movement of the flight through the hopper and a narrow edge facing the floor so that particles of particulate material cannot become lodged between the flight and the floor; and
a plurality of lugs extending outwardly from the chains for cleaning debris from the portions of the particulate material receiving hopper adjacent the intersections of the side walls and the floor.

18. A particulate material conveyor system comprising:
a particulate material receiving hopper comprising generally downwardly and inwardly sloping side walls and a floor extending between the lower portions of the side walls;

a pair of drive chains mounted for movement along spaced, parallel paths extending along the opposite edges of the floor adjacent the side walls;

a plurality of flights each connected between the chains for movement along the floor to transport particulate material through the hopper; and a plurality of lugs extending outwardly from the chains for clearing debris from the portions of the particulate material receiving hopper adjacent the intersections of the side walls and the floor.

* * * * *